United States Patent
Kim et al.

(10) Patent No.: US 8,358,630 B2
(45) Date of Patent: Jan. 22, 2013

(54) METHOD OF TRANSMITTING AT LEAST ONE SUB-PACKET BASED ON FEEDBACK INFORMATION IN A WIRELESS COMMUNICATION SYSTEM

(75) Inventors: Sang G. Kim, San Diego, CA (US); Shu Wang, San Diego, CA (US); Young Cheul Yoon, San Diego, CA (US); Li-Hsiang Sun, San Diego, CA (US); Soonyil Kwon, San Diego, CA (US); Suk Woo Lee, San Diego, CA (US); Hobin Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 693 days.

(21) Appl. No.: 11/671,437

(22) Filed: Feb. 5, 2007

(65) Prior Publication Data
US 2007/0201437 A1 Aug. 30, 2007

Related U.S. Application Data

(60) Provisional application No. 60/765,487, filed on Feb. 3, 2006, provisional application No. 60/775,022, filed on Feb. 17, 2006, provisional application No. 60/765,488, filed on Feb. 3, 2006.

(51) Int. Cl.
*H04W 4/00* (2009.01)
(52) U.S. Cl. .......... 370/332; 370/352; 370/330; 455/69; 455/101
(58) Field of Classification Search .................. 455/101, 455/69; 370/332, 352, 330
See application file for complete search history.

(56) References Cited

U.S. PATENT DOCUMENTS

| | | | |
|---|---|---|---|
| 7,006,464 B1 * | 2/2006 | Gopalakrishnan et al. | 370/328 |
| 2001/0033622 A1 * | 10/2001 | Jongren et al. | 375/267 |
| 2003/0123396 A1 * | 7/2003 | Seo et al. | 370/252 |
| 2003/0129989 A1 * | 7/2003 | Gholmieh et al. | 455/452 |
| 2003/0148738 A1 * | 8/2003 | Das et al. | 455/67.5 |
| 2004/0057530 A1 | 3/2004 | Tarokh et al. | |
| 2004/0109433 A1 * | 6/2004 | Khan | 370/345 |
| 2005/0207367 A1 * | 9/2005 | Onggosanusi et al. | 370/315 |
| 2005/0213543 A1 * | 9/2005 | Shimizu et al. | 370/335 |

(Continued)

FOREIGN PATENT DOCUMENTS

CN 1463098 12/2003
(Continued)

OTHER PUBLICATIONS

Shattil_Multiple-Access-Method-and-System_Aug-19-1999_WO_99-41871.pdf.*

(Continued)

*Primary Examiner* — Olumide T Ajibade Akonai
*Assistant Examiner* — Alexander Yi
(74) *Attorney, Agent, or Firm* — Lee, Hong, Degerman, Kang & Waimey

(57) ABSTRACT

A method of transmitting subsequent sub-packets in a wireless communication system using a hybrid automatic request (HARQ) technique is disclosed. The method includes receiving feedback information from at least one receiving end, transmitting a transmit packet via at least one overhead channel, wherein the transmit packet includes information on carrier and antenna combination selected for subsequent transmission, and transmitting at least one sub-packet according to the selected carrier and antenna combination.

6 Claims, 20 Drawing Sheets

U.S. PATENT DOCUMENTS

| | | | | |
|---|---|---|---|---|
| 2005/0233716 | A1* | 10/2005 | Laroia et al. | 455/133 |
| 2005/0265223 | A1* | 12/2005 | Song | 370/208 |

FOREIGN PATENT DOCUMENTS

| | | |
|---|---|---|
| CN | 1625164 | 6/2005 |
| CN | 1633822 | 6/2005 |
| EP | 0 735 701 A3 | 10/1996 |
| EP | 1 458 118 B1 | 9/2004 |
| JP | 2002374224 | 12/2002 |
| JP | 2003234718 | 8/2003 |
| JP | 2003284118 | 10/2003 |
| JP | 2003318856 | 11/2003 |
| JP | 2004282744 | 10/2004 |
| JP | 2005086304 | 3/2005 |
| JP | 2005151567 | 6/2005 |
| JP | 2005518756 | 6/2005 |
| JP | 2005318470 | 11/2005 |
| JP | 2005533406 | 11/2005 |
| JP | 2006504370 | 2/2006 |
| KR | 10-1999-0071875 | 9/1999 |
| WO | 02091625 | 11/2002 |
| WO | 2004/084420 | 9/2004 |
| WO | 2005055527 | 6/2005 |
| WO | 2005089000 | 9/2005 |

OTHER PUBLICATIONS

Jarot__Nov-Dec-2000__European-Transactions-on-Telecommunications__2000__vol.11__no.6__pgs539-545.pdf.*

* cited by examiner

CDMA SPREADING AND DESPREADING

CDMA SPREADING AND DESPREADING USING MULTIPLE SPREADING SEQUENCES

CDMA 2000 CALL PROCESSING OVERVIEW

CDMA 2000 INITIALIZATION STATE

SYSTEM ACCESS STATE

FIG. 7
COMPARISON OF CDMA2000 FOR 1x AND 1xEV-DO
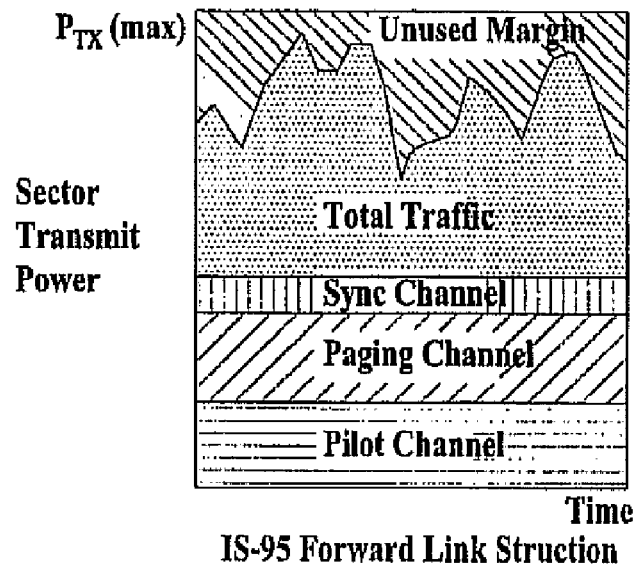
IS-95 Forward Link Struction
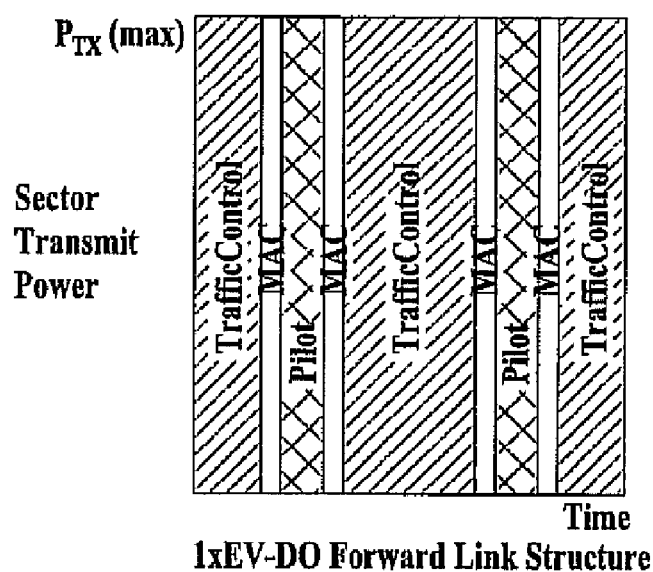
1xEV-DO Forward Link Structure 1xEV-DO NETWORK ARCHITECTURE 1xEV-DO DEFAULT PROTOCOL

1xEV-DO NON-DEFAULT PROTOCOL

1xEV-DO CONNECTION LAYER PROTOCOLS

1xEV-DO ACK/NAK OPERATION

1xEV-DO ACK CHANNEL IN REVERSE LINK

METHOD OF TRANSMITTING AT LEAST ONE SUB-PACKET BASED ON FEEDBACK INFORMATION IN A WIRELESS COMMUNICATION SYSTEM

This application claims the benefit of U.S. Provisional Application No. 60/765,487, filed on Feb. 3, 2006, and U.S. Provisional Application No. 60/775,022, filed on Feb. 17, 2006, which are hereby incorporated by reference, and further claims the benefit of U.S. Provisional Application No. 60/765,488, filed on Feb. 3, 2006.

BACKGROUND OF THE INVENTION

1. Field of the Invention

The present invention relates to a method of transmitting sub-packets, and more particularly, to a method of transmitting at least one sub-packet based on feedback information in a wireless communication system. Although the present invention is suitable for a wide scope of applications, it is particularly suitable for transmitting sub-packets associated with hybrid automatic request using feedback information which can be transmitted based on various means.

2. Discussion of the Related Art

In a wireless communication environment, a transmitting end send pilot or pilot signals to a receiving end. In response, the receiving end sends feedback information on the channels through which the pilot signals were transmitted. Based on this feedback, the transmitting end transmits data effectively and efficiently.

However, there is no guarantee that the data (also referred to as data packets or packets) are received accurately by the receiving end. Moreover, there is no guarantee that the transmitting end transmitted the packets effectively and efficiently.

Today, users of wireless communication enjoy freedom of mobility. That is, the user with a mobile terminal is able to travel from one place to another while talking to someone without losing connection. Often times, a user can move from one service coverage area to another service coverage area (e.g., from one cell/sector to another cell/sector). In such a situation, the user can continue talking on his/her mobile terminal even in cell edge areas through proper scheduling of transmit power from a base station.

To address the fast changing wireless communication environment it is important that a more effective and efficient ways of transmitting data when the data is not accurately received by the receiving end. Further, it is important for the feedback information to provide more detailed information so that the transmitting end can make better data transmission.

SUMMARY OF THE INVENTION

Accordingly, the present invention is directed to a method of transmitting at least one sub-packet based on feedback information in a wireless communication system that substantially obviates one or more problems due to limitations and disadvantages of the related art.

An object of the present invention is to provide a method transmitting subsequent sub-packets in a wireless communication system using a hybrid automatic request (HARQ) technique.

Another object of the present invention is to provide a of transmitting feedback information in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting subsequent sub-packets in a wireless communication system using a hybrid automatic request (HARQ) technique includes receiving feedback information from at least one receiving end, transmitting a transmit packet via at least one overhead channel, wherein the transmit packet includes information on carrier and antenna combination selected for subsequent transmission, and transmitting at least one sub-packet according to the selected carrier and antenna combination.

In another aspect of the present invention, a method of transmitting feedback information in a wireless communication system includes transmitting the feedback information to at least one transmitting end, wherein the feedback information includes an indication to a selection of a combination in a sub-active set.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 7 illustrates a conventional cdma2000 access attempt;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
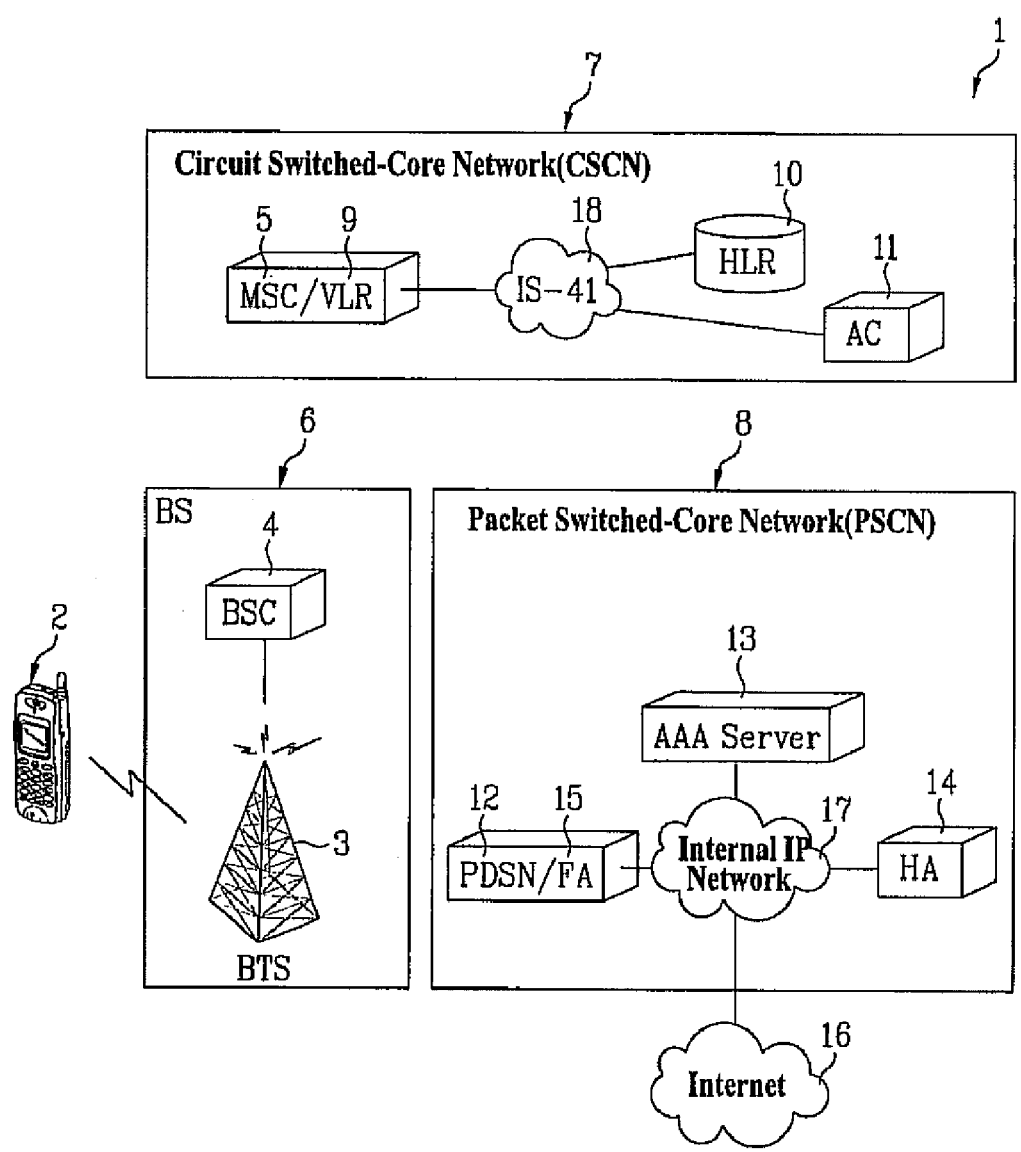
FIG. 1 illustrates wireless communication network architecture.

Referring to FIG. 1, a wireless communication network architecture 1 is illustrated. A subscriber uses a mobile station (MS) 2 to access network services. The MS 2 may be a portable communications unit, such as a hand-held cellular phone, a communication unit installed in a vehicle, or a fixed-location communications unit.

The electromagnetic waves for the MS 2 are transmitted by the Base Transceiver System (BTS) 3 also known as node B. The BTS 3 consists of radio devices such as antennas and equipment for transmitting and receiving radio waves. The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (US) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one or more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (R), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 10, 11 is an IS-41 standard interface 18.

The Packet data Serving Node (PDSN) 12 portion of the PSCN 8 provides routing for packet data traffic to and from MS 2. The PDSN 12 establishes, maintains, and terminates link layer sessions to the MS 2's 2 and may interface with one of more BS 6 and one of more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the AAA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Figure 2A:
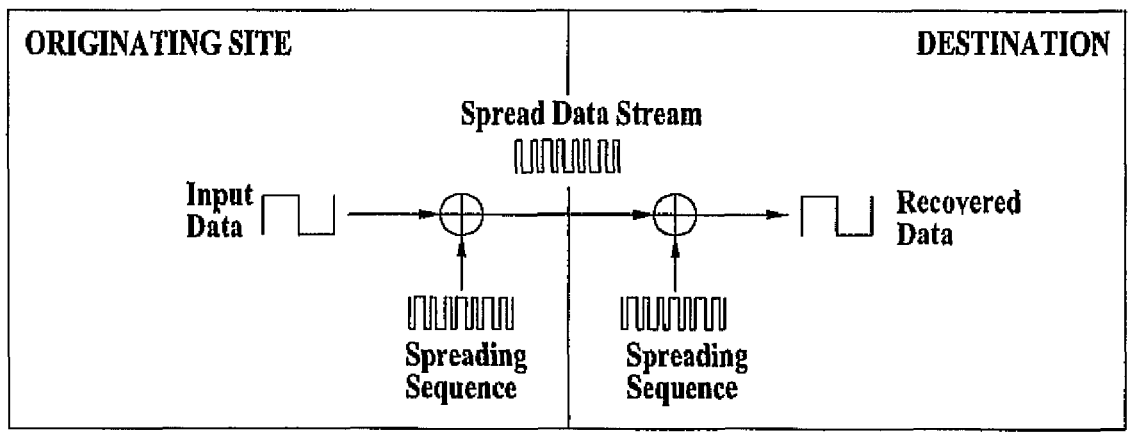
FIG. 2A illustrates a CDMA spreading and de-spreading process.
Figure 2B:
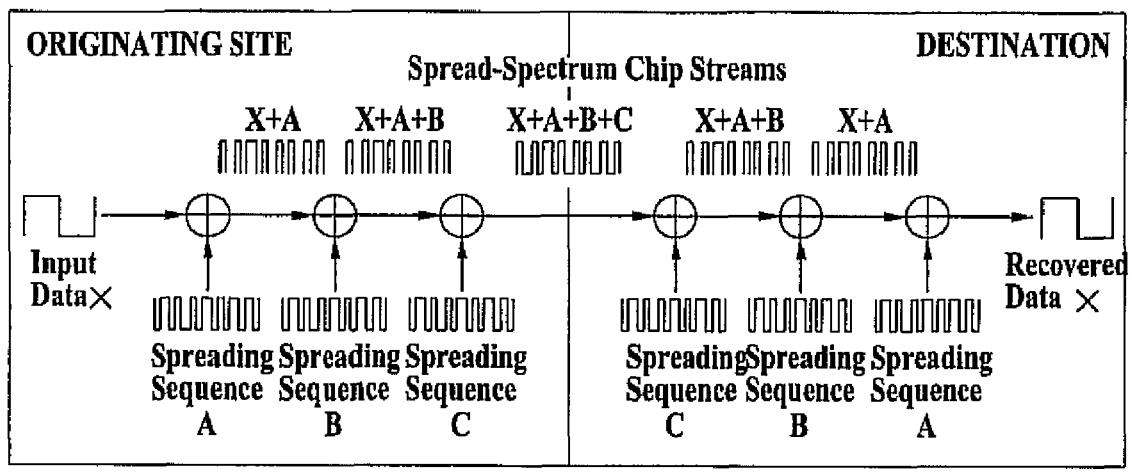
FIG. 2B illustrates a CDMA spreading and de-spreading process using multiple spreading sequences.

Input data is combined with a fast spreading sequence and transmitted as a spread data stream. A receiver uses the same spreading sequence to extract the original data. FIG. 2A illustrates the spreading and de-spreading process. As illustrated in FIG. 2B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in read only memory (ROM).

A short PN code is another type of spreading sequence. A short PN code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN code is generated in a 42-bit register and is more than 40 days long, or about $4 \times 10^{13}$ chips long. Due to its length, a long PN code cannot be stored in ROM in a terminal and, therefore, is generated chip-by-chip.

Each MS 2 codes its signal with the PN long code and a unique offset, or public long code mask, computed using the long PN code ESN of 32-bits and 10 bits set by the system. The public long code mask produces a unique shift. Private long code masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time, A forward channel is identified by its CDMA RF carrier frequency, the unique short code PN offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN Offset of the individual MS 2. Reverse channels include traffic channels and access channels.

Individual users use traffic channels during actual calls to transmit traffic to the BTS 3. A reverse traffic channel is basically a user-specific public or private long code Mask and there are as many reverse traffic channels as there are CDMA terminals.

An MS 2 not yet involved in a call uses access channels to transmit registration requests, call setup requests, page responses, order responses and other signaling information. An access channel is basically a public long code offset unique to a BTS 3 sector. Access channels are paired with paging channels, with each paging channel having up to 32 access channels.

CDMA communication provides many advantages. Some of the advantages are variable rate vocoding and multiplexing, power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Using a RAKE receiver allows a MS 2 to use the combined outputs of the three traffic correlators, or "RAKE fingers," every frame. Each RAKE finger can independently recover a particular PN Offset and Walsh code. The fingers may be targeted on delayed multipath reflections of different BTS's 3, with a searcher continuously checking pilot signals.

The MS 2 drives soft handoff. The MS 2 continuously checks available pilot signals and reports to the BTS 3 regarding the pilot signals it currently sees. The BTS 3 assigns up to a maximum of six sectors and the MS 2 assigns its fingers accordingly. All messages are sent by dim-and-burst without muting. Each end of the communication link chooses the best configuration on a frame-by-frame basis, with handoff transparent to users.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

Figure 3:
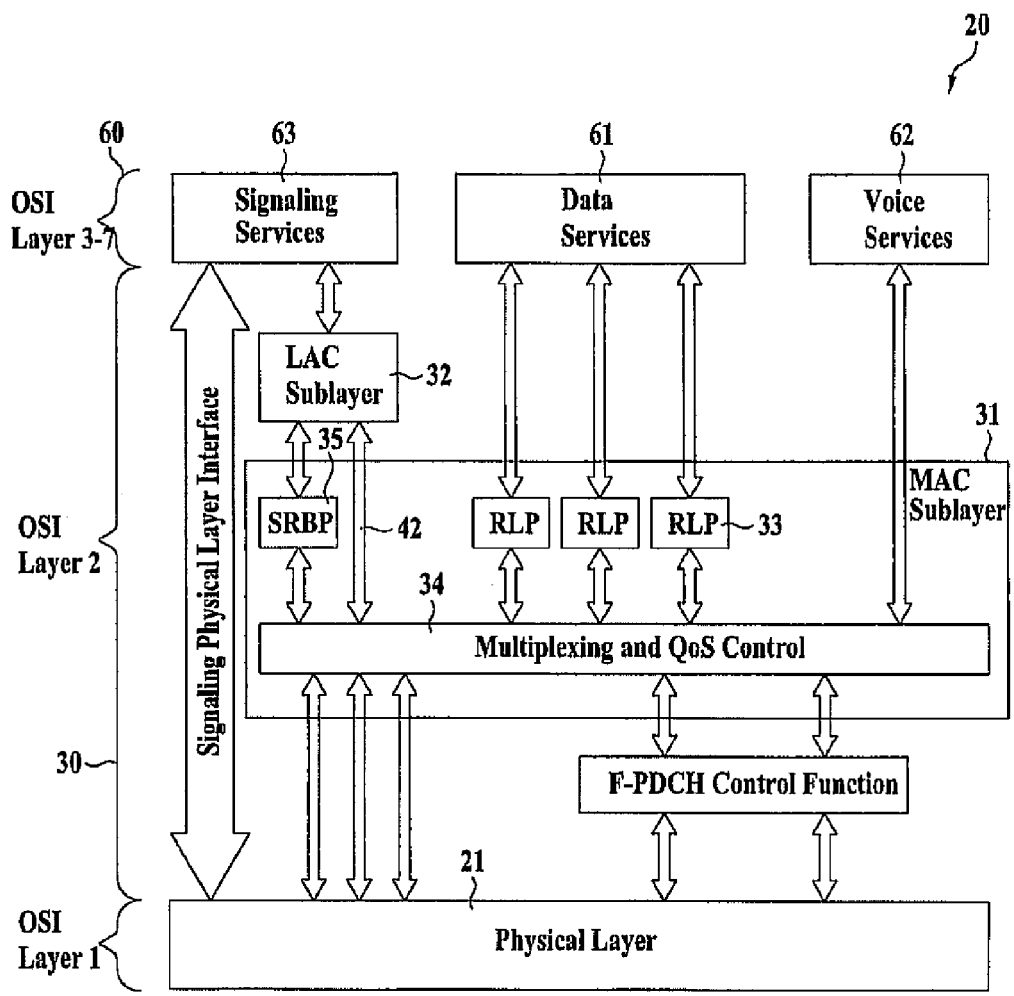
FIG. 3 illustrates a data link protocol architecture layer for a cdma2000 wireless network.

FIG. 3 illustrates a data link protocol architecture layer 20 for a cdma2000 wireless network. The data link protocol architecture layer 20 includes an Upper Layer 60, a Link Layer 30 and a Physical layer 21.

The Upper layer 60 includes three sublayers; a Data Services sublayer 61; a Voice Services sublayer 62 and a Signaling Services sublayer 63. Data services 61 are services that deliver any form of data on behalf of a mobile end user and include packet data applications such as IP service, circuit data applications such as asynchronous fax and B-ISDN emulation services, and SMS. Voice services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

The Link Layer 30 is subdivided into the Link Access Control (LAC) sublayer 32 and the Medium Access Control (MAC) sublayer 31. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 20.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The Link Access Control (LAC) sublayer 32 provides correct delivery of signaling messages. Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a best-effort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 20 is responsible for coding and modulation of data transmitted over the air. The Physical Layer 20 conditions digital data from the higher layers so that the data may be transmitted over a mobile radio channel reliably.

The Physical Layer 20 maps user data and signaling, which the MAC sublayer 31 delivers over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

Figure 4:
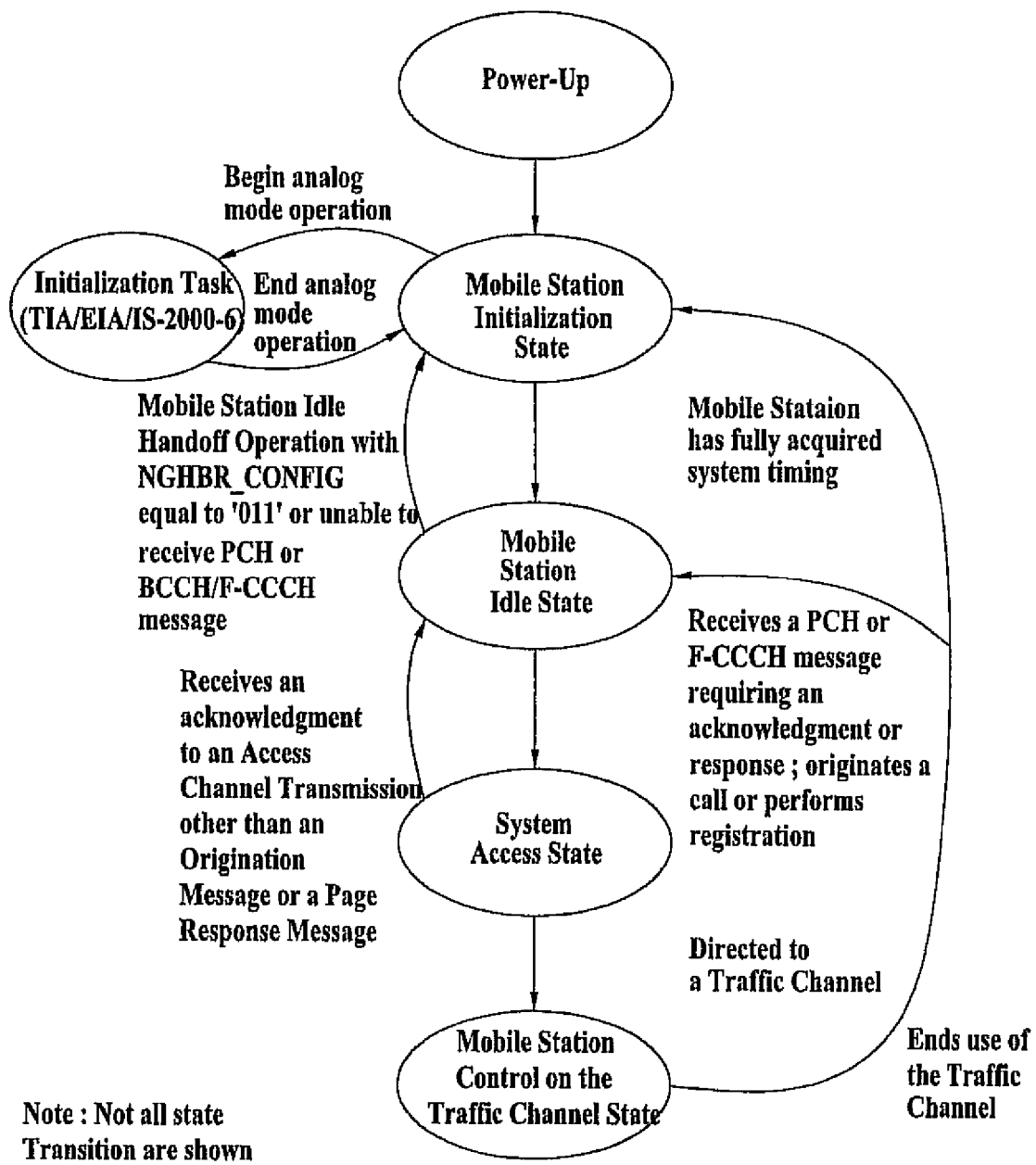
FIG. 4 illustrates cdma2000 call processing.

FIG. 4 illustrates an overview of call processing. Processing a call includes pilot and sync channel processing, paging channel processing, access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 Control on Traffic Channel State, with the dedicated forward and reverse traffic channels carrying user information, such as voice and data.

Figure 5:
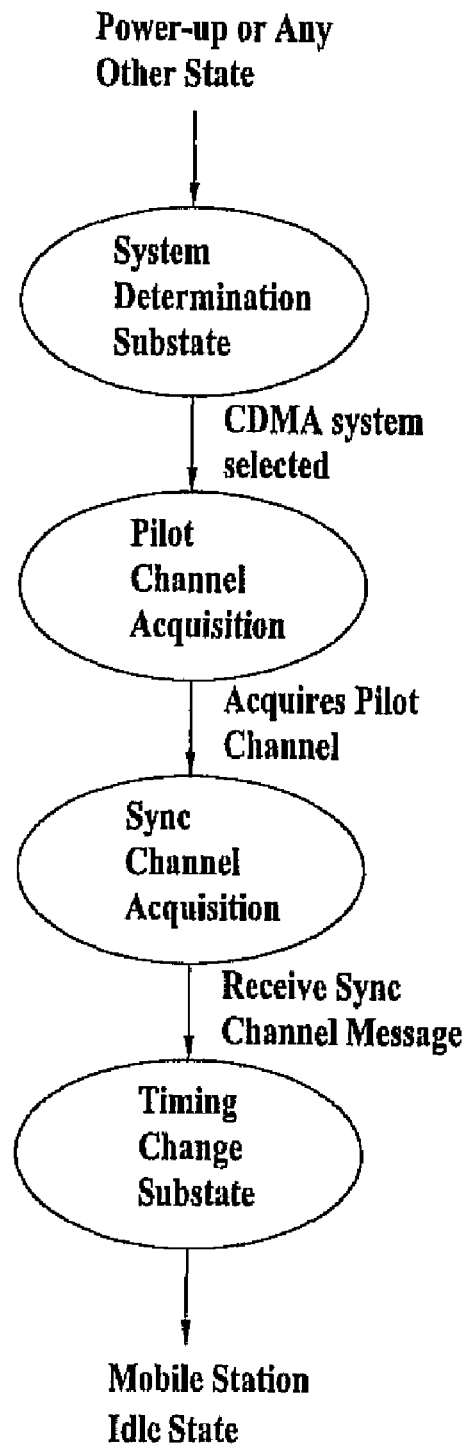
FIG. 5 illustrates the cdma2000 initialization state.

FIG. 5 illustrates the initialization state of a MS 2. The Initialization state includes a System Determination Substate, Pilot Channel Acquisition, Sync Channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier A custom selection process may control System Determination. A service provider using a redirection process may also control System determination. After the MS 2 selects a system, it must determine on which channel within that system to search for service. Generally the MS 2 uses a prioritized channel list to select the channel.

Pilot Channel Processing is a process whereby the MS 2 first gains information regarding system timing by searching for usable pilot signals. Pilot channels contain no information, but the MS 2 can align its own timing by correlating with the pilot channel. Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

In cdma2000, there may be many pilot channels, such as OTD pilot, STS pilot and Auxiliary pilot, on a single channel. During System Acquisition, the MS 2 will not find any of these pilot channels because they are use different Walsh codes and the MS is only searching for Walsh 0.

The sync channel message is continuously transmitted on the sync channel and provides the MS 2 with the information to refine timing and read a paging channel. The mobile receives information from the BS 6 in the sync channel message that allows it to determine whether or not it will be able to communicate with that BS.

In the Idle State, the MS 2 receives one of the paging channels and processes the messages on that channel. Overhead or configuration messages are compared to stored sequence numbers to ensure the MS 2 has the most current parameters. Messages to the MS 2 are checked to determine the intended subscriber.

The BS 6 may support multiple paging channels and/or multiple CDMA channels (frequencies). The MS 2 uses a hash function based on its IMSI to determine which channel and frequency to monitor in the Idle State. The BS 6 uses the same hash function to determine which channel and frequency to use when paging the MS 2.

Using a Slot Cycle Index (SCI) on the paging channel and on F-CCCH supports slotted paging. The main purpose of slotted paging is to conserve battery power in MS 2. Both the MS 2 and BS 6 agree in which slots the MS will be paged. The MS 2 can power down some of its processing circuitry during unassigned slots. Either the General Page message or the Universal Page message may be used to page the mobile on F-CCCH. A Quick paging channel that allows the MS 2 to power up for a shorter period of time than is possible using only slotted paging on F-PCH or F-CCCH is also supported.

Figure 6:
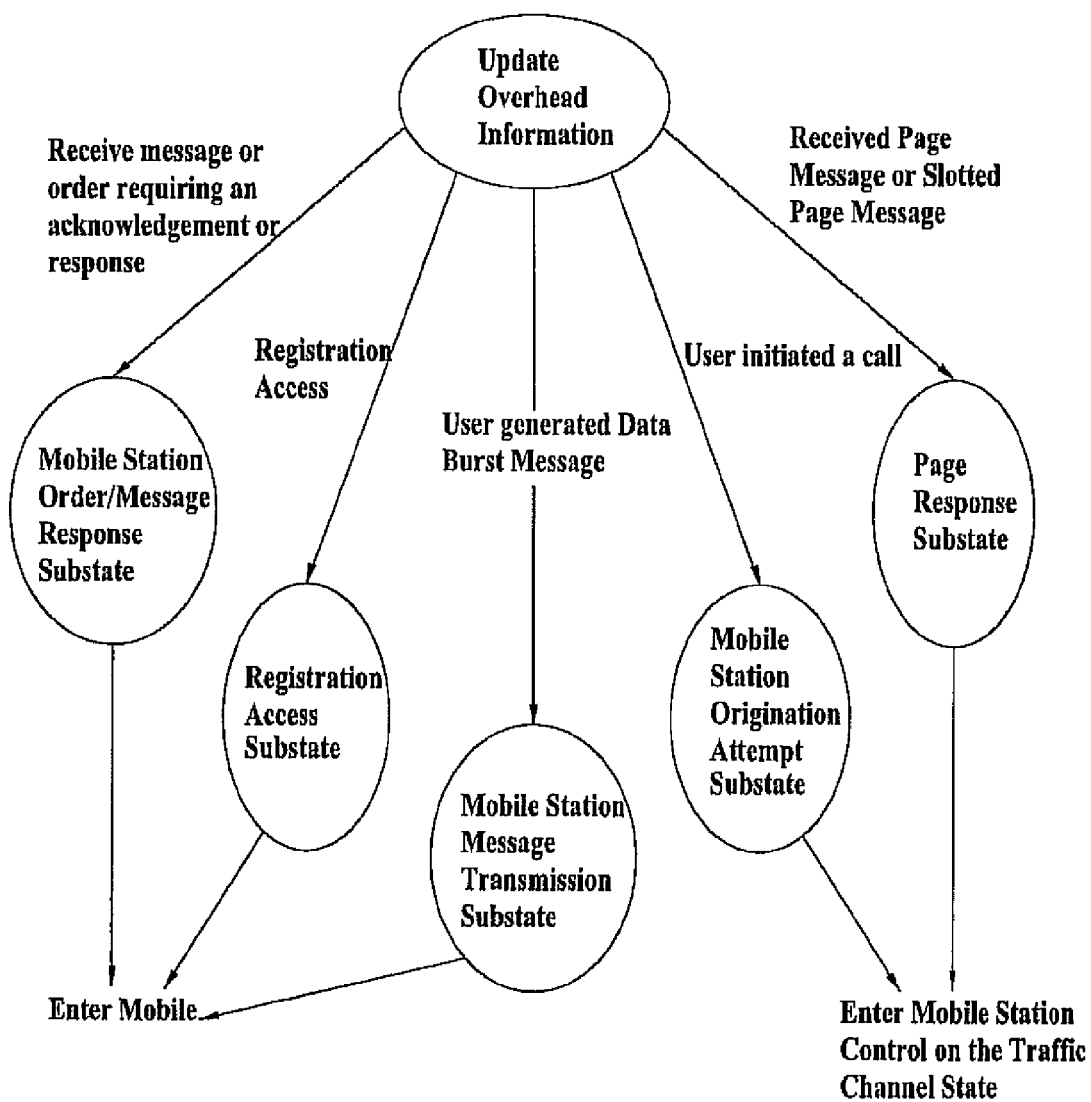
FIG. 6 illustrates the cdma2000 system access state.

FIG. 6 illustrates the System Access state, The first step in the system access process is to update overhead information to ensure that the MS 2 is using the correct access channel parameters, such as initial power level and power step increments. A MS 2 randomly selects an access channel and transmits without coordination with the BS 6 or other MS. Such a random access procedure can result in collisions. Several steps can be taken to reduce the likelihood of collision, such as use of a slotted structure, use of a multiple access channel, transmitting at random start times and employing congestion control, for example, overload classes.

The MS 2 may send either a request or a response message on the access channel. A request is a message sent autonomously, such as an Origination message. A response is a message sent in response to a message received from the BS 6. For example, a Page Response message is a response to a General Page message or a Universal message.

Figure 8:
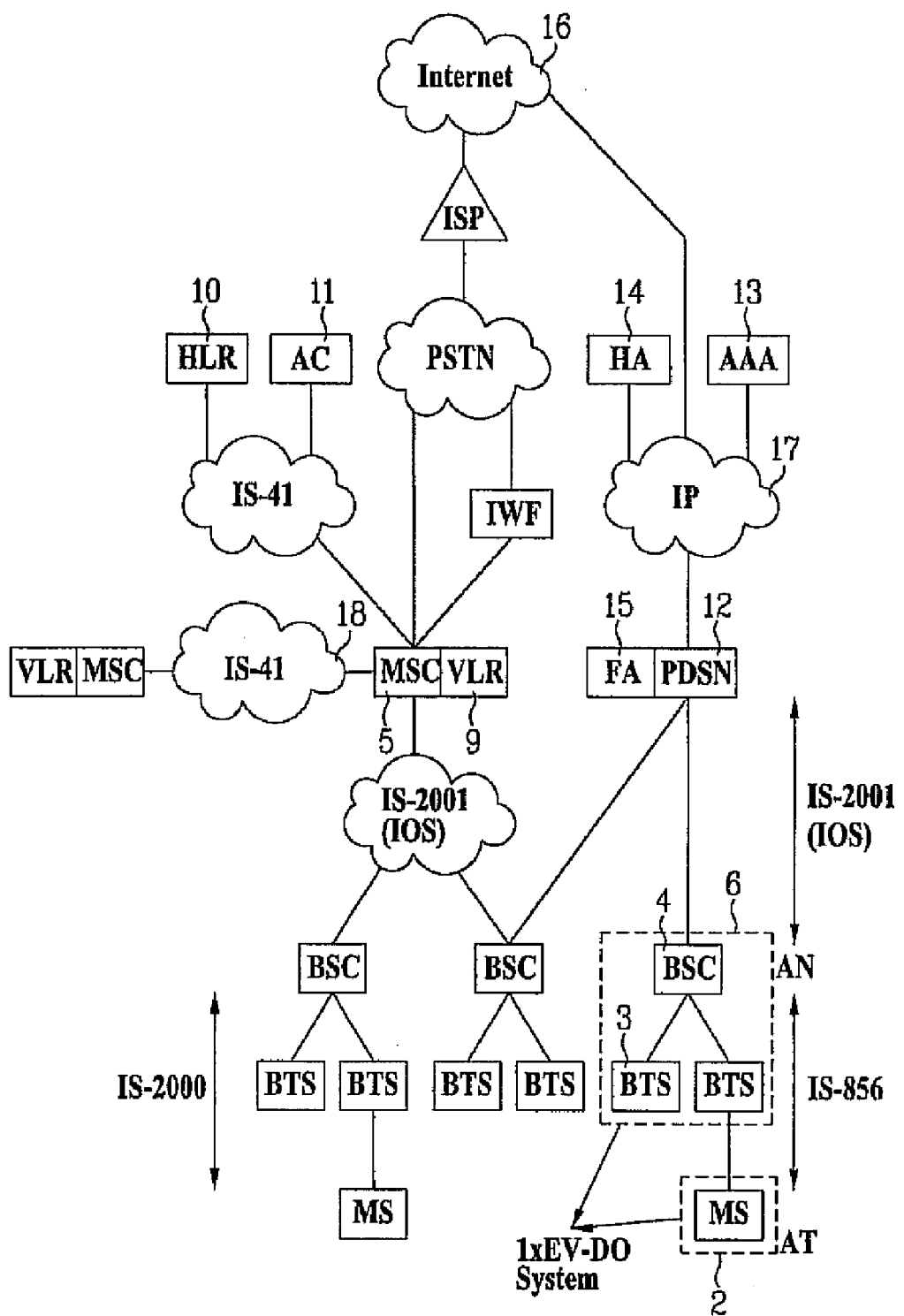
FIG. 8 illustrates a conventional cdma2000 access sub-attempt.
Figure 9:
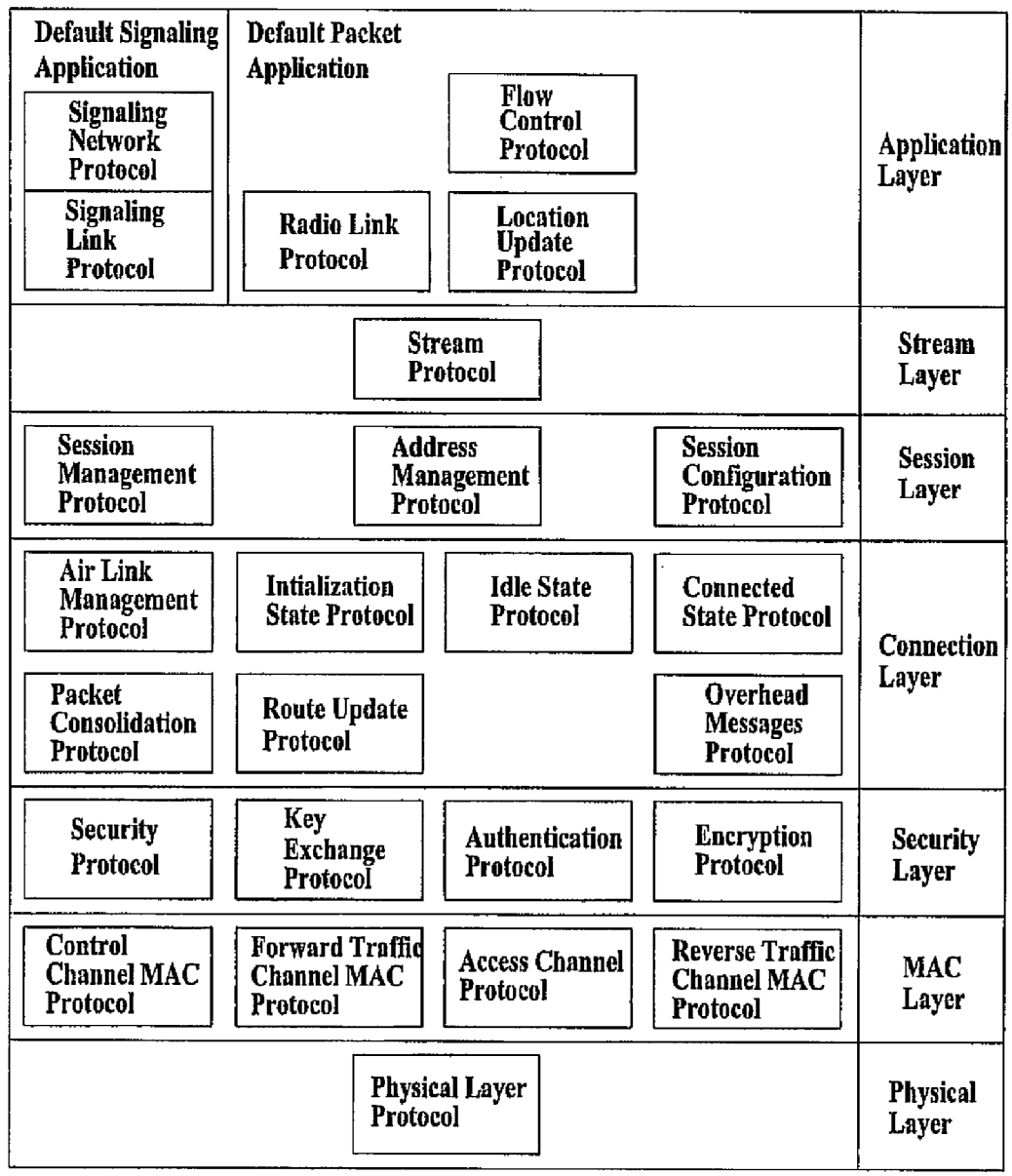
FIG. 9 illustrates the conventional cdma2000 system access state using slot offset.

An access attempt, which refers to the entire process of sending one Layer 2 encapsulated PDU and receiving an acknowledgment for the PDU, consists of one or more access sub-attempts, as illustrated in FIG. 7. An access sub-attempt includes of a collection of access probe sequences, as illustrated in FIG. 8. Sequences within an access sub-attempt are separated by a random backoff interval (RS) and a persistence delay (PD). PD only applies to access channel request, not response. FIG. 9 illustrates a System Access state in which collisions are avoided by using a slot offset of 0-511 slots.

The Multiplexing and QoS Control sublayer 34 has both a transmitting function and a receiving function. The transmitting function combines information from various sources, such as Data Services 61, Signaling Services 63 or Voice Services 62, and forms Physical layer SDUs and PDCHCF SDUs for transmission. The receiving function separates the information contained in Physical Layer 21 and PDCHCF SDUs and directs the information to the correct entity, such as Data Services 61, Upper Layer Signaling 63 or Voice Services 62.

The Multiplexing and QoS Control sublayer 34 operates in time synchronization with the Physical Layer 21. If the Physical Layer 21 is transmitting with a non-zero frame offset, the Multiplexing and QoS Control sublayer 34 delivers Physical Layer SDUs for transmission by the Physical Layer at the appropriate frame offset from system time.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the sync channel, forward common control channel, broadcast control channel, paging channel and access channel procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

Processing within the LAC Sublayer 32 is done sequentially, with processing entities passing the partially formed LAC PDU to each other in a well-established order. SDUs and PDUs are processed and transferred along functional paths, without the need for the upper layers to be aware of the radio characteristics of the physical channels. However, the upper layers could be aware of the characteristics of the physical channels and may direct Layer 2 30 to use certain physical channels for the transmission of certain PDUs.

Figure 10:
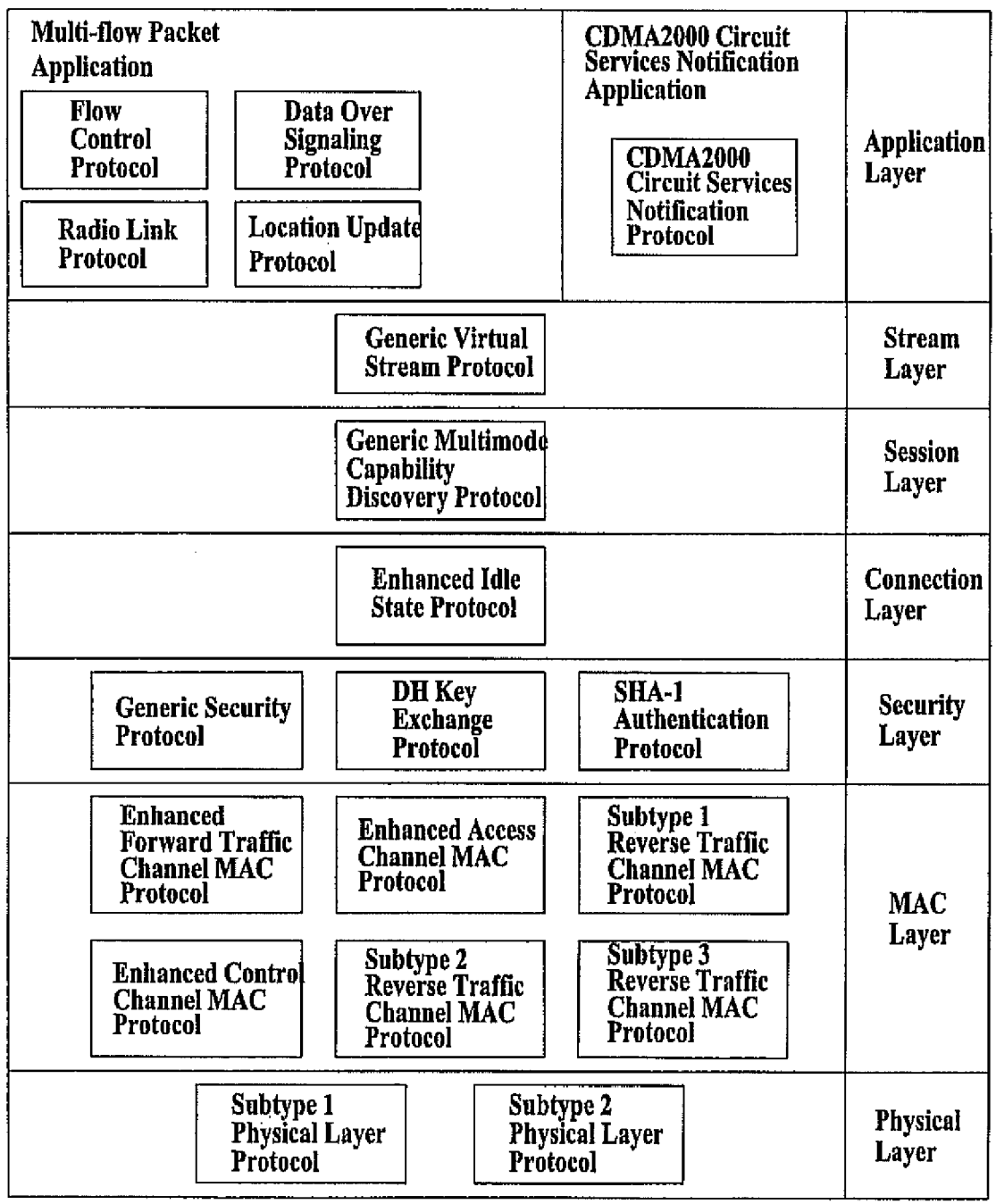
FIG. 10 illustrates a comparison of cdma2000 for 1x and 1xEV-DO.

A 1xEV-DO system is optimized for packet data service and characterized by a single 1.25 MHz carrier ("1x") for data only or data Optimized ("DO"), Furthermore, there is a peak data rate of 2.4 Mbps or 3.072 Mbps on the forward Link and 153.6 Kbps or 1.8432 Mbps on the reverse Link. Moreover, a 1xEV-DO system provides separated frequency bands and internetworking with a 1x System. FIG. 10 illustrates a comparison of cdma2000 for a 1x system and a 1xEV-DO system.

In CDMA2000, there are concurrent services, whereby voice and data are transmitted together at a maximum data rate of 614.4 kbps and 307.2 cbps in practice. An MS 2 communicates with the MSC 5 for voice calls and with the PDSN 12 for data calls. A cdma2000 system is characterized by a fixed rate with variable power with a Walsh-code separated forward traffic channel.

In a 1xEV-DO system, the maximum data rate is 2.4 Mbps or 3.072 Mbps and there is no communication with the circuit-switched core network 7. A 1xEV-DO system is characterized by fixed power and a variable rate with a single forward channel that is time division multiplexed.

Figure 11:
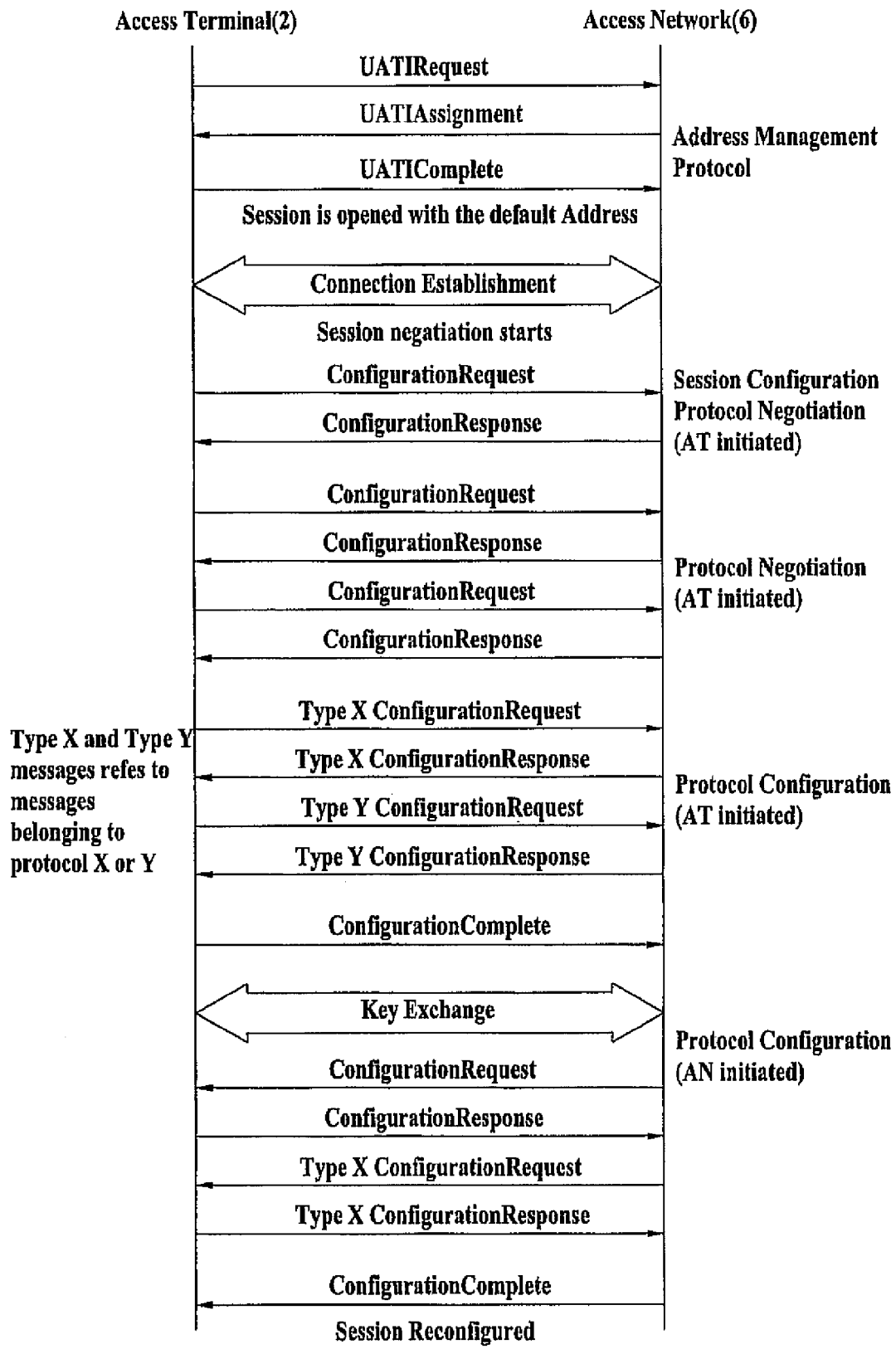
FIG. 11 illustrates a network architecture layer for a 1xEV-DO wireless network.
Figure 12:
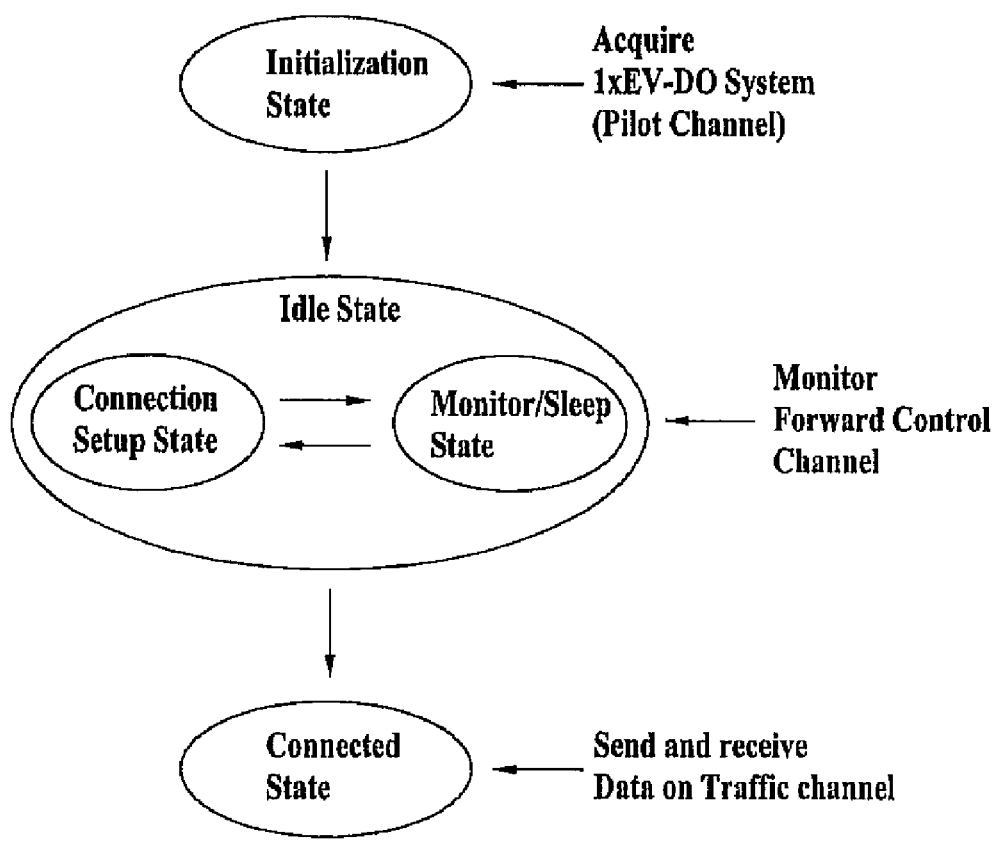
FIG. 12 illustrates 1xEV-DO default protocol architecture.
Figure 13:
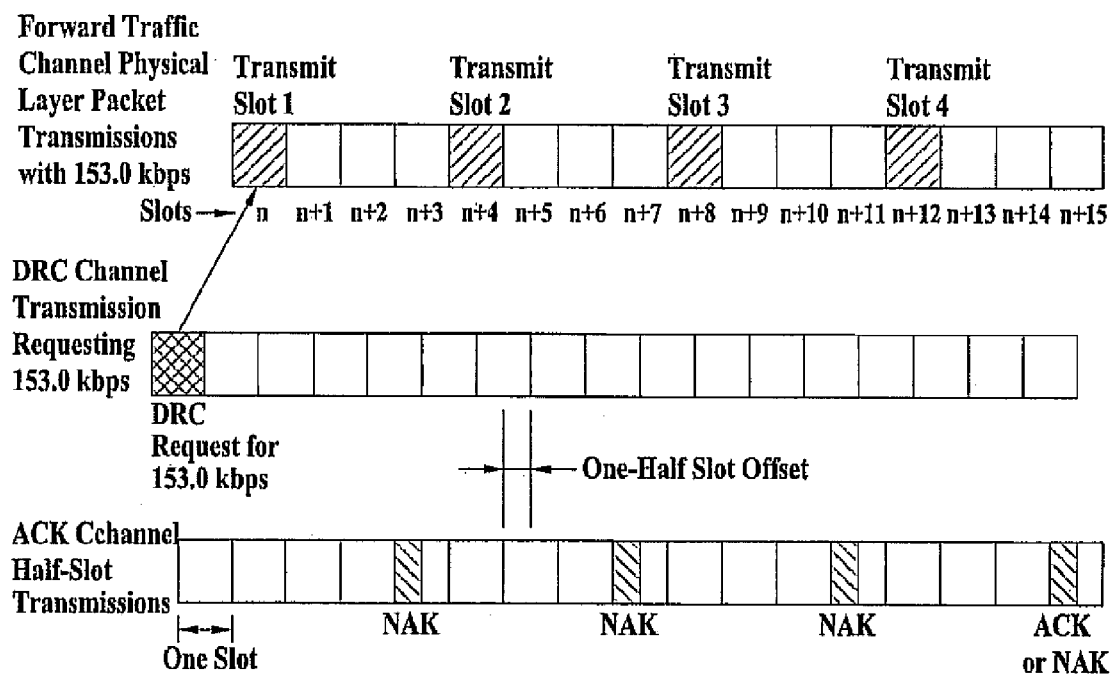
FIG. 13 illustrates 1xEV-DO non-default protocol architecture.

FIG. 11 illustrates a 1xEV-DO system architecture. In a 1xEV-DO system, a frame consists of 16 slots, with 600 slots/sec, and has a duration of 26.67 ms, or 32,768 chips. A single slot is 1.6667 ms long and has 2048 chips. A control/traffic channel has 1600 chips in a slot, a pilot channel has 192 chips in a slot and a MAC channel has 256 chips in a slot. A 1xEV-DO system facilitates simpler and faster channel estimation and time synchronization, FIG. 12 illustrates a 1xEV-DO default protocol architecture. FIG. 13 illustrates a 1xEV-DO non-default protocol architecture.

Information related to a session in a 1xEV-DO system includes a set of protocols used by an MS 2, or access terminal (AT), and a BS 6, or access network (AN), over an airlink, a Unicast Access Terminal Identifier (UATI), configuration of the protocols used by the AT and AN over the airlink and an estimate of the current AT location.

The Application Layer provides best effort, whereby the message is sent once, and reliable delivery, whereby the message can be retransmitted one or more times. The stream layer provides the ability to multiplex up to 4 (default) or 255 (non-default) application streams for one AT 2.

The Session Layer ensures the session is still valid and manages closing of session, specifies procedures for the initial UATI assignment, maintains AT addresses and negotiates/provisions the protocols used during the session and the configuration parameters for these protocols.

Figure 14:
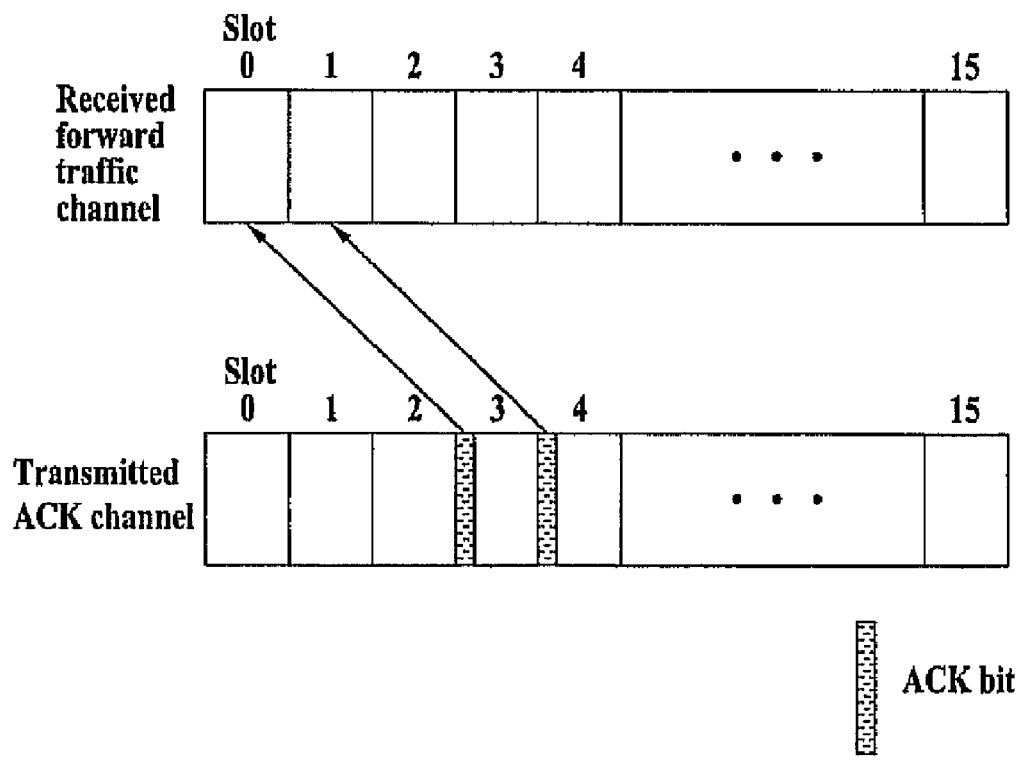
FIG. 14 illustrates 1xEV-DO session establishment.

FIG. 14 illustrates the establishment of a 1xEV-DO session. As illustrated in FIG. 14, establishing a session includes address configuration, connection establishment, session configuration and exchange keys.

Address configuration refers to an Address Management protocol assigning a UATI and Subnet mask. Connection establishment refers to Connection Layer Protocols setting up a radio link. Session configuration refers to a Session Configuration Protocol configuring all protocols. Exchange key refers a Key Exchange protocol in the Security Layer setting up keys for authentication.

A "session" refers to the logical communication link between the AT 2 and the RNC, which remains open for hours, with a default of 54 hours. A session lasts until the PPP session is active as well. Session information is controlled and maintained by the RNC in the AN 6.

When a connection is opened, the AT 2 can be assigned the forward traffic channel and is assigned a reverse traffic channel and reverse power control channel. Multiple connections may occur during single session.

The Connection Layer manages initial acquisition of the network and communications. Furthermore, the Connection Layer maintains an approximate AT 2 location and manages a radio link between the AT 2 and the AN 6. Moreover, the Connection Layer performs supervision, prioritizes and encapsulates transmitted data received from the Session Layer, forwards the prioritized data to the Security Layer and decapsulates data received from the Security Layer and forwards it to the Session Layer.

Figure 15A:
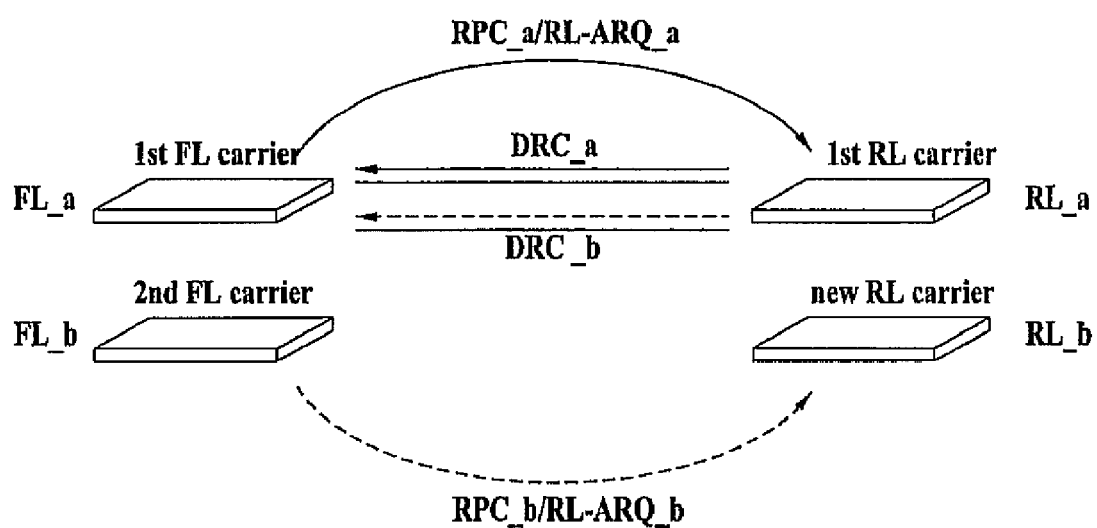
FIG. 15 illustrates 1xEV-DO connection layer protocols
Figure 15B:
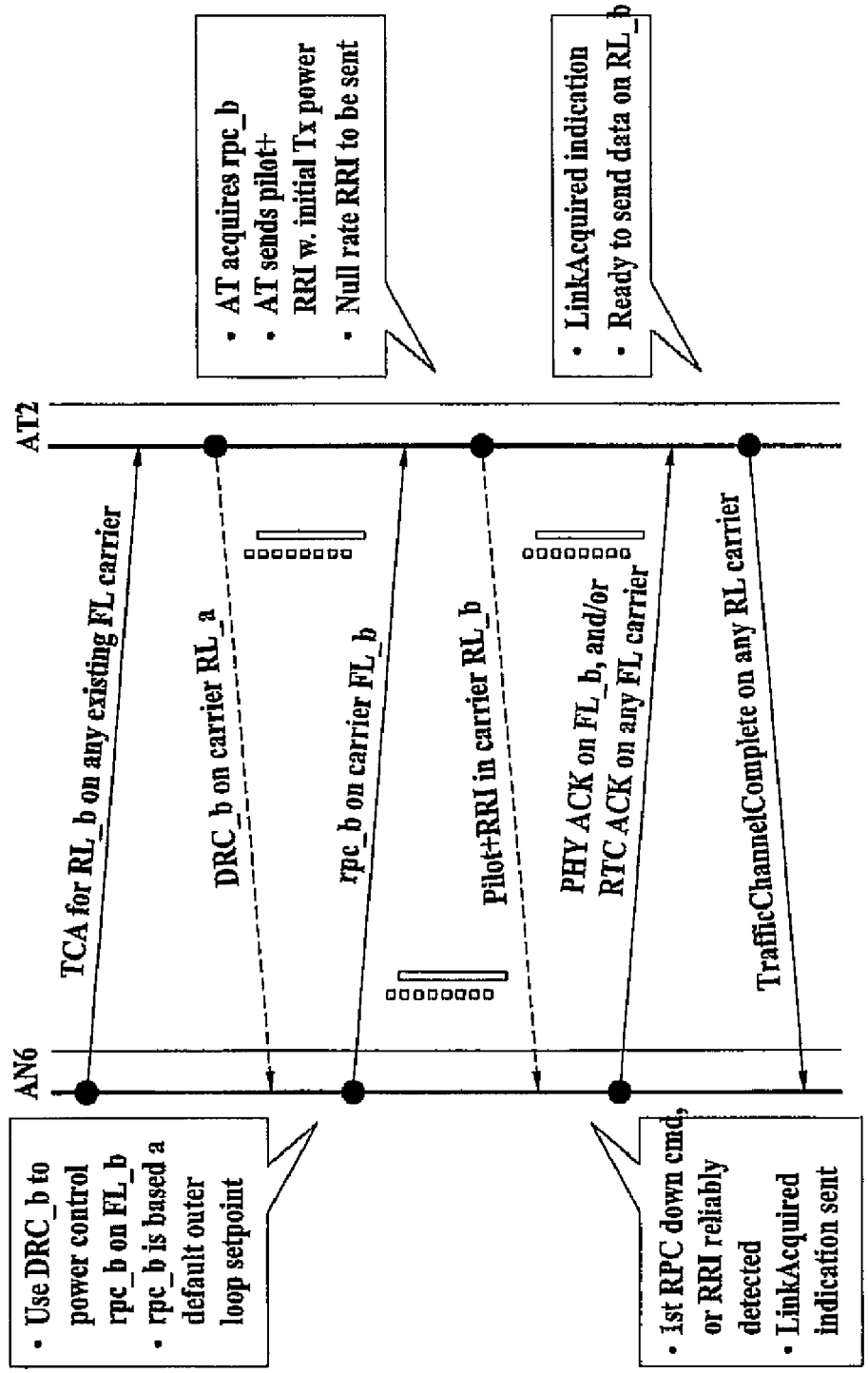
Figure 16:
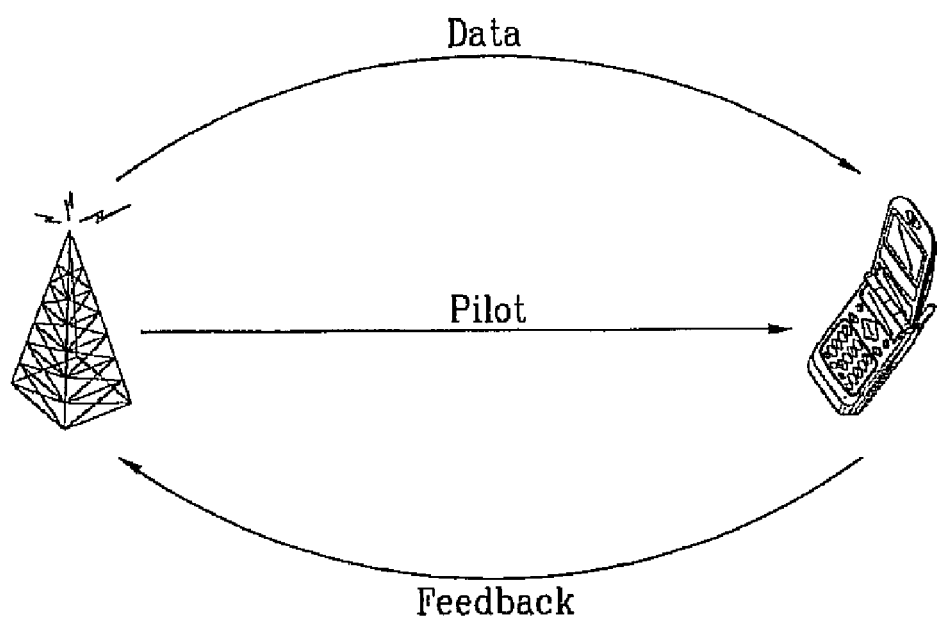
FIG. 16 is an exemplary diagram illustrating transmission of pilot signal and feedback information between a single transmitting end and a single receiving end.

FIG. 15 illustrates Connection Layer Protocols. As illustrated in FIG. 16, the protocols include an Initialization State, an Idle State and a Connected State.

In the Initialization State, the AT 2 acquires the AN 6 and activates the initialization State Protocol. In the Idle State, a closed connection is initiated and the Idle State Protocol is activated. In the Connected State, an open connection is initiated and the Connected State Protocol is activated.

A closed connection refers to a state where the AT 2 is not assigned any dedicated air-link resources and communications between the AT and AN 6 are conducted over the access channel and the control channel. An open connection refers to a state where the AT 2 can be assigned the forward traffic channel, is assigned a reverse power control channel and a reverse traffic channel and communication between the AT 2 and AN 6 is conducted over these assigned channels as well as over the control channel.

The Initialization State Protocol performs actions associated with acquiring an AN 6. The Idle State Protocol performs actions associated with an AT 2 that has acquired an AN 6, but does not have an open connection, such as keeping track of the AT location using a Route Update Protocol. The Connected State Protocol performs actions associated with an AT 2 that has an open connection, such as managing the radio link between the AT and AN 6 and managing the procedures leading to a closed connection. The Route Update Protocol performs actions associated with keeping track of the AT 2 location and maintaining the radio link between the AT and AN 6. The Overhead Message Protocol broadcasts essential parameters, such as QuickConfig, SectorParameters and AccessParameters message, over the control channel. The Packet Consolidation Protocol consolidates and prioritizes packets for transmission as a function of their assigned priority and the target channel as well as providing packet demultiplexing on the receiver.

The Security Layer includes a key exchange function, authentication function and encryption function. The key exchange function provides the procedures followed by the AN 2 and AT 6 for authenticating traffic. The authentication function provides the procedures followed by the AN 2 and AT 6 to exchange security keys for authentication and encryption. The encryption function provides the procedures followed by the AN 2 and AT 6 for encrypting traffic.

The 1xEV-DO forward Link is characterized in that no power control and no soft handoff is supported. The AN 6 transmits at constant power and the AT 2 requests variable rates on the forward Link. Because different users may transmit at different times in TDM, it is difficult to implement diversity transmission from different BS's 6 that are intended for a single user.

In the MAC Layer, two types of messages originated from higher layers are transported across the physical layer, specifically a User data message and a signaling message. Two protocols are used to process the two types of messages, specifically a forward traffic channel MAC Protocol for the User data message and a control channel MAC Protocol, for the signaling message.

The Physical Layer is characterized by a spreading rate of 1.2288 Mcps, a frame consisting of 16 slots and 26.67 ms, with a slot of 1.67 ms and 2048 chips. The forward Link channel includes a pilot channel, a forward traffic channel or control channel and a MAC channel.

The pilot channel is similar to the to the cdma2000 pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 3.072 Mbps. Physical Layer packets can be transmitted in 1 to 16 slots and the transmit slots use 4-slot interlacing when more than one slot is allocated. If ACK is received on the reverse Link ACK channel before all of the allocated slots have been transmitted, the remaining slots shall not be transmitted.

The control channel is similar to the sync channel and paging channel in cdma2000. The control channel is characterized by a period of 256 slots or 427.52 ms, a Physical Layer packet length of 1024 bits or 128, 256, 512 and 1024 bits and a data rate of 38.4 kbps or 76.8 kbps or 19.2 kbps, 38.4 kbps or 76.8 kbps.

The 1xEV-DO reverse link is characterized in that the AN 6 can power control the reverse Link by using reverse power control and more than one AN can receive the AT's 2 transmission via soft handoff. Furthermore, there is no TDM on the reverse Link, which is channelized by Walsh code using a long PN code.

An access channel is used by the AT 2 to initiate communication with the AN 6 or to respond to an AT directed message. Access channels include a pilot channel and a data channel.

An AT 2 sends a series of access probes on the access channel until a response is received from the AN 6 or a timer expires. An access probe includes a preamble and one or more access channel Physical Layer packets. The basic data rate of the access channel is 9.6 kbps, with higher data rates of 19.2 kbps and 38.4 kbps available.

When more that one AT 2 is paged using the same Control channel packet, Access Probes may be transmitted at the same time and packet collisions are possible. The problem can be more serious when the ATs 2 are co-located, are in a group call or have similar propagation delays.

One reason for the potential of collision is the inefficiency of the current persistence test in conventional methods. Because an AT 2 may require a short connection setup time, a paged AT may transmit access probes at the same time as another paged AT when a persistence test is utilized.

Conventional methods that use a persistence test are not sufficient since each AT 2 that requires a short connection setup times and/or is part of a group call may have the same persistence value, typically set to 0. If AT's 2 are co-located, such as In a group call, the Access Probes arrive at the An 6 at the same time, thereby resulting in access collisions and increased connection setup time.

Therefore, there is a need for a more efficient approach for access probe transmission from co-located mobile terminals requiring short connection times. The present invention addresses this and other needs such as interference cancellation.

In a wireless communication system having multiple antennas, a feedback channel (or feedback information) can be used for by a receiving end (e.g., access terminal, mobile station, or mobile terminal) to report the channel condition regarding one or more forward links (or sometimes, reverse links). The feedback information can include the channel condition/quality for the best serving sector and/or carrier (sub-carrier) and/or antenna as well as any combination of these having the strongest signal. In order for a transmitting end (e.g., access network, base station, or Node B) to take advantage of forward link or reverse link frequency diversity, the receiving end can have a specified number, N, of carriers (sub-carriers) assigned and report the channel conditions on N number of feedback channels.

In the wireless communication system (e.g., code division multiple access 2000 evolution data only (EV-DO) system), at least one antenna can be located per cell/sector. Furthermore, the at least one antenna can be located in the receiving end. EV-DO offers fast packet establishment on both the forward and reverse links along with air interface enhancements that reduce latency and improve data rates.

FIG. 16 is an exemplary diagram illustrating transmission of pilot signal and feedback information between a single transmitting end and a single receiving end. However, a number of transmitting end and a number of receiving end as well as a number of carriers (sub-carriers), antennas, and/or sector (s)/cell(s) are not limited to one.

In transmitting data from at least one user, the transmitting end typically sends pilots or pilot signals via all available antennas and sub-carriers to at least one receiving end. In response, the receiving end sends back feedback information regarding the channel condition/quality of each sub-carrier including the antenna(s). Based on the feedback information, the transmitting end determines the carrier/antenna combination for transmitting the data or data packets. The feedback information can be transmitted periodically as well as aperiodically.

Even if the data packets are transmitted based on the feedback information provided from the receiving end(s), the transmitted sub-packet may not be received and decoded accurately. To address this issue, an automatic request (ARQ)

or an hybrid-ARQ (HARQ) can be used. In ARQ or HARQ, data packets or sub-packets are usually re-transmitted. However, if the re-transmission of the sub-packet(s) takes place via the same carrier/antenna used to transmit the previous/original packet(s), then there is a chance that re-transmitted sub-packet(s) may or may not be received accurately again, especially, if the channel condition is bad.

With respect to re-transmission, based on the CQI and/or acknowledgement of the previous sub-packet transmission, the same carrier/antenna or different carrier/antenna can be used for the transmission of subsequent sub-packet(s). Therefore, subsequent (or simultaneous) sub-packets can be transmitted on same carriers (or a set of tones) or antennas, or different cells/sectors. As discussed, antennas can be referred to as cells/sectors.

This is valuable in that power can be saved, the chance of early termination can be maximized, or the delay can be minimized. Here, multiple carriers (or tones) and/or antennas are assumed.

To this end, a forward link (FL) overhead channel can be used to carry information, indicating the carrier, frequency tones, or antennas, for the associated sub-packet. In other words, the overhead channel can be used to provide which carrier/antenna has been selected by the transmitting end to carry the subsequent sub-packets. Again, the decision by the transmitting end can be based on the CQI and/or acknowledgement of the previous sub-packet transmission.

One of the reasons for providing the selected carrier/antenna combination via the overhead channel is so that the receiving end can know which carrier and antenna to look to for re-transmission of the sub-packets. Consequently, such information can help in receiving and decoding the sub-packet(s).

Alternatively, the sub-packets (subsequent, different antennas, or carriers) can be sent with different transmission formats. In other words, the sub-packets can be modulated differently using different modulation schemes. The transmission format of a subsequently transmitted sub-packet may be different from the transmission format of the previous sub-packet, based on the most updated CQI.

For example, the previous transmission is made using a specified modulation scheme (e.g, quadrature phase shift keying (QPSK) with a specified code rate). However, based on the CQI, the next transmission can be made using a different modulation scheme which can result in successful reception/demodulation. As such, the subsequent transmission can be made using a different format or modulation scheme (e.g., binary phase shift keying (BPSK)).

Since the overhead channel is transmitted with the sub-packet transmission, the current sub-packet can be transmitted using the different transmission format used in the transmission of the previous sub-packet. For example, if the channel quality is favorable, then the sub-packet with a shorter duration, higher modulation, and coding can be transmitted.

As another alternative for re-transmission, the sub-packets can be sent on more than one carrier/antenna simultaneously.

Figure 17:
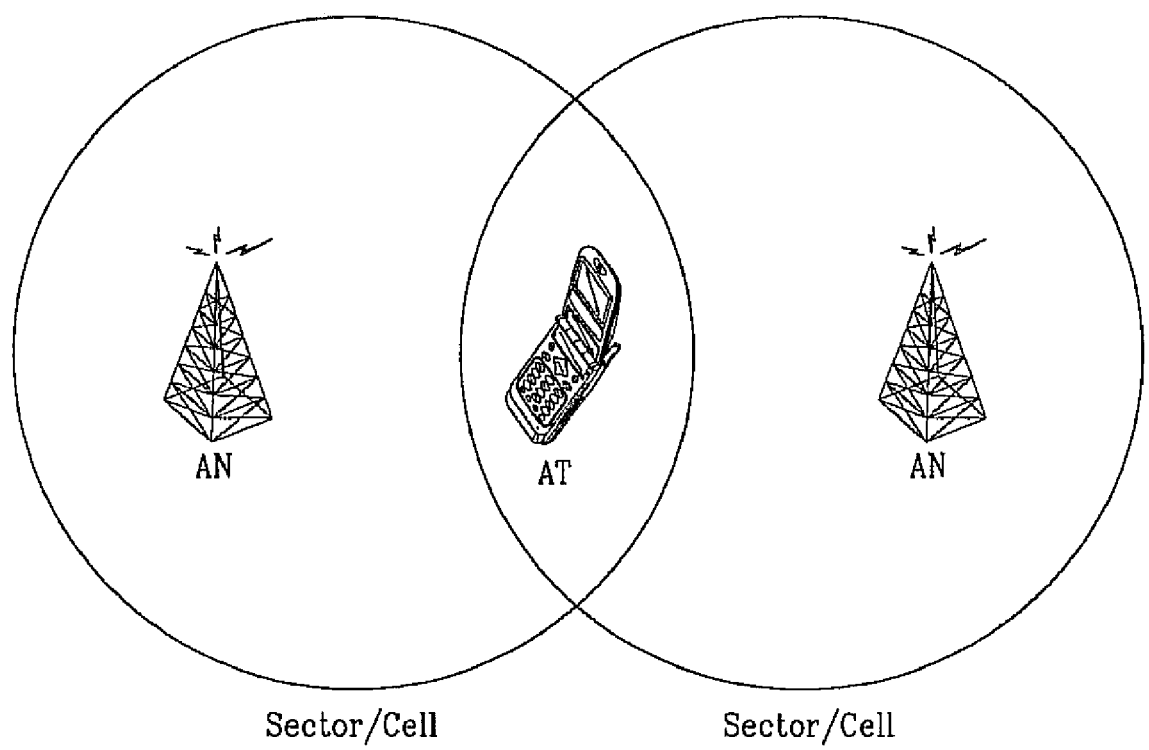
FIG. 17 is an exemplary diagram illustrating handover situation.

In a wireless communication system, a transmitting side (e.g., access network) can send data to a receiving side (e.g., access terminal). If the receiving side is located near a cell/sector edge region, the data transmitted from the transmitting side may experience difficulty, due to factors such as low receive power and/or interference, in receiving the data. The same difficulties may be experienced in multi-cell/sector environments where interference can be encountered from neighboring cells/sectors, and in particular, during handover/handoff situations. FIG. 17 is an exemplary diagram illustrating handover situation.

By using the combinations of selected carriers and antennas, the users can be provided with high and more reliable data transmission in a relatively good channel condition. In addition, the users having bad channel condition can benefit as well.

To address such problems of above, a carrier and/or antenna and/or sector/cell having the best channel condition or channel quality can be selected for transmission. To this end, the receiving side needs to provide feedback information to the transmitting side regarding which carrier/antenna out of plurality of carriers/antennas has the best channel condition/quality. The channel condition can be measured based on a pilot sent from the transmitting side to the receiving side, for example. Using the feedback (e.g., channel quality information (CQI) or a data rate control (DRC)), the transmitting side can choose the carrier, antenna, or sector/cell as well and any combination thereof for transmitting the data. Additionally, the sector/cell can have at least one antenna element.

The feedback information can be transmitted periodically as well as aperiodically. With periodic or aperiodic feedback, the transmitting end can select better carrier/antenna/sector combinations than from the previous transmission. Due to susceptibility of transmission successes and failures depending on channel conditions, periodic or aperiodic feedback information provides the transmitting end to adapt or adjust to the changing channel conditions for better transmission of data.

Based on the feedback information from the receiving end, the feedback information can include a selection by the receiving end as to which combination of antenna(s) and carrier(s) for transmission. To put differently, the receiving end can indicate or point to the combination provided in a sub-active set.

The sub-active set can be described as an index of different carrier (sub-carrier) and antenna combinations. For example, in a system having two (2) sub-carriers (e.g., Sub-carrier #1 and Sub-carrier #2) and two (2) antennas (e.g., Antenna #1 and Antenna #2), the possible combinations can be as follows. Here, the index has four (4) different combinations. Index 1 indicates a combination of Sub-carrier #1 and Antenna #1, index 2 indicates a combination of Sub-carrier #1 and Antenna #2, index 3 indicates a combination of Sub-carrier #2 and Antenna #1, and index 4 indicates a combination of Sub-carrier #2 and Antenna #2. Based on the channel condition/quality, the receiving end selects any one or at least one of the index/indices and feedbacks its selection to the transmitting end. In short, the sub-active set provides information regarding which carrier and/or antenna has better channel condition.

For example, if the channel condition/quality of the pilot transmitted via Antenna #2/Sub-carrier #1 has the strongest signal or has the best channel condition, the sub-packet can be transmitted via Antenna #2/Sub-carrier #1.

Further, the size of the index depends on the number of carriers and antennas that are available in the system. Moreover, it is possible to select a pair of antennas as well as a pair of carrier/sub-carriers.

In making the selection for the optimum carrier/antenna combination, the receiving end can use the pilots sent from the transmitting end. For example, in a multiple antenna system, the transmitting end can simultaneously send different types of pilots, Type A and Type B, via Antenna #1 and Antenna #2. In other words, both Type A and Type B pilots are transmitted on different sub-carriers to the receiving end via Antenna #1, and similarly, both Type A and Type B pilots are transmitted on different sub-carriers to the receiving end via Antenna #2. Based on the channel condition, the receiving end can select Type A pilot for having better channel condition for Antenna #1 while selecting Type B for Antenna #2. The feedback as to which type pilot (Type A or Type B) is better is provided to the transmitting end per antenna.

Through the sub-active set, the receiving side can point to (or indicate) the carrier/antenna having the best channel condition. Put differently, the CQI channel can point to a carrier (s)/antenna(s) in the sub-active set. The same concept can also be applied to sectors/cells with respect to carriers/antennas. That is, the receiving end can provide which carrier or sub-carrier has better transmit quality, and which sector/cell has better channel condition. As discussed, the antenna can also be referred to as sector/cell.

Further, a number of sub-active sets can correspond to the number of assigned carriers. In a single antenna selection, the receiving end can be assigned a specified number of sub-carrier(s) per antenna. Based on the channel condition, the receiving end provides which sub-carrier per antenna has a better or best channel quality. For example, if three (3) sub-carriers are assigned to the receiving end, then there can be up to three (3) sub-active sets.

If the receiving end is in soft handoff/handover, a combined CQI channel can be used as a sub-active set. That is, similar to above, the combined CQI channel can point or indicate to one or a set of antennas among all carriers/antennas. For example, if space-time coding (STC) with two (2) transmitter antennas is used for a forward link (FL) transmission, and each sector has N number of antennas sending type-A pilots and M number of antennas sending type-B pilots, then two (2) CQI channels, one for each type, can be used as the combined feedback channel for the sub-active set. The access terminal (AT) is constrained to point these two (2) channels to the antennas which have the same data source.

In providing the feedback information, the selection of combinations of carriers and antennas can be interlaced. The interlaces can be categorized into an odd interlace(s) and an even interlace(s). For example, the odd interlaces can provide channel quality/condition of the transmit channels. Here, the odd interlaces can serve the function similar to that of a data rate control (DRC) value (e.g., CQI value) through which the channel quality is provided. At the same time, the even interlaces can be used to provide the selected antenna. Here, the even interlaces can serve the function similar to that of the selected index which is described above. These odd and even interlaces are combined to form a set of interlaces and provided to the transmitting end to inform as to which combination of carrier/antenna.

Further, the feedback information can be provided in form of a CQI cover. Traditionally, the CQI cover can be used to point to the receiving end (e.g., access network or base station). Here, the CQI cover can be used to provide information regarding the sub-carrier as well as the antenna selected by the receiving end. To put differently, a number of bits for the CQI cover can be extended/increased to include a sector identification and selected antenna. Further, the extended CQI cover can include the sector identification and the selected antenna as well as the information equivalent to the CQI value. Here, the CQI value remains unchanged while the CQI cover changes to include the information on the sector identification and the antenna(s).

Simply put, the number of bits of the CQI cover can be extended such that the cover represents selected antennas which can be in the same or different sectors/cells. If there is more than one transmitting end, then the extended CQI cover can include the selection of the transmitting end in addition to the selection of carrier/antenna combination. Similarly, the CQI cover can further include the CQI value.

As an alternative method of providing the feedback information, a number of bits for the CQI value can be extended or increased. If a specified number of bits are used to indicate the CQI value, four (4) bits, for example, a number of bits can be added, two (2) bits for example. In other words, instead of using four (4) bits, as conventionally used, a total of six (6) bits can be used for the DRC value. Hence, four (4) bits can be used to for the original or conventional purpose, and the extended/added two (2) bits can be used to indicate the antenna selection. Here, the CQI cover remains unchanged (e.g., sector identification) while the CQI value changes.

As the number of bits of the CQI value can be extended to include the information of the selected antenna(s), the extended CQI value can represent selected antenna indices and CQI index pair. Moreover, in selecting the antennas, more than two antennas can be selected based on the channel conditions.

As another alternative of providing feedback information, a differential value can be used. In other words, instead of providing a full CQI value every time, a differential value relative to the previous value can be provided. More specifically, a full CQI value is initially provided so that a reference can be determined. Using the full CQI value as the reference, subsequent transmissions include differential value. For example, the subsequent differential value can indicate "up or down" so that the transmitting end can either increase or decrease relative to the previous value. With this arrangement, the transmission power for the CQI channel can be reduced.

For example, regarding multiple CQI channels, one anchor CQI channel can send a full CQI value while the other CQI channel sends a differential value relative to the full CQI value of the other channel in reporting its full CQI value. Here, one of a plurality of carriers (or antennas) can be an anchor carrier while other carriers are dependent on the anchor carrier. The assumption here is that there is not much variation between carriers. Alternatively, each CQI channel can send a full CQI value.

As discussed above with respect to handoff/handover situations, there can be multiple transmitters at the transmitting side. In situations related to soft, softer, or even softest handoffs, multiple CQIs can be used to transmit a CQI to each transmitter (transmitting sector in the active set). Further, multiple power control commands (basically equivalent to differential CQI) can be sent to each transmitter. In addition, the power level of the different CQIs can be different and can be controlled separately by each sector. In other words, the difference in power levels are based on the power command from each transmitter. The transmitter can be any one of a base station, access network, Node B, network, mobile station, mobile terminal, and access terminal.

With respect to various techniques regarding feedback, these techniques can be applied to spatial multiplexing. In order for spatial multiplexing to come in effect, there are at least two (2) antennas at the transmitting end. Moreover, the transmitting end and/or the receiving ends may be in different sectors/cells.

Further, with respect to spatial multiplexing, the receiving end can send code (rank) selection to the transmitting end. The code (rank) selection refers to a number of carriers/antennas available for transmission. Here, at least two (2) CQIs can be sent to the transmitting end, and the code (rank) selection provides information regarding a number of channels as well as sizes of each channel. Thereafter, the CQI is used to identify how much data can be transmitted on the carrier. For example, if there are two carriers, two (2) CQIs are needed, one for each carrier. As another example, the code index and the CQI for the code index can be used. Parallel CQI channels can be indicated by code indices and the corresponding CQI value.

As discussed above, multiple channels can be used to provide feedback information to the transmitting end, especially, in multiple antenna environment. Further, the transmitting end (e.g., access network) can use the feedback information to select the best channel (or carrier/antenna) for transmitting the data. As another form of feedback information, the CQI can be used.

In the CQI, the receiving end includes information on which carrier/antenna has the best channel quality and frequency pair (pilot) based on the transmission from the transmitting end. As discussed, the CQI can also be substituted by a data rate control (DRC).

Figure 18:
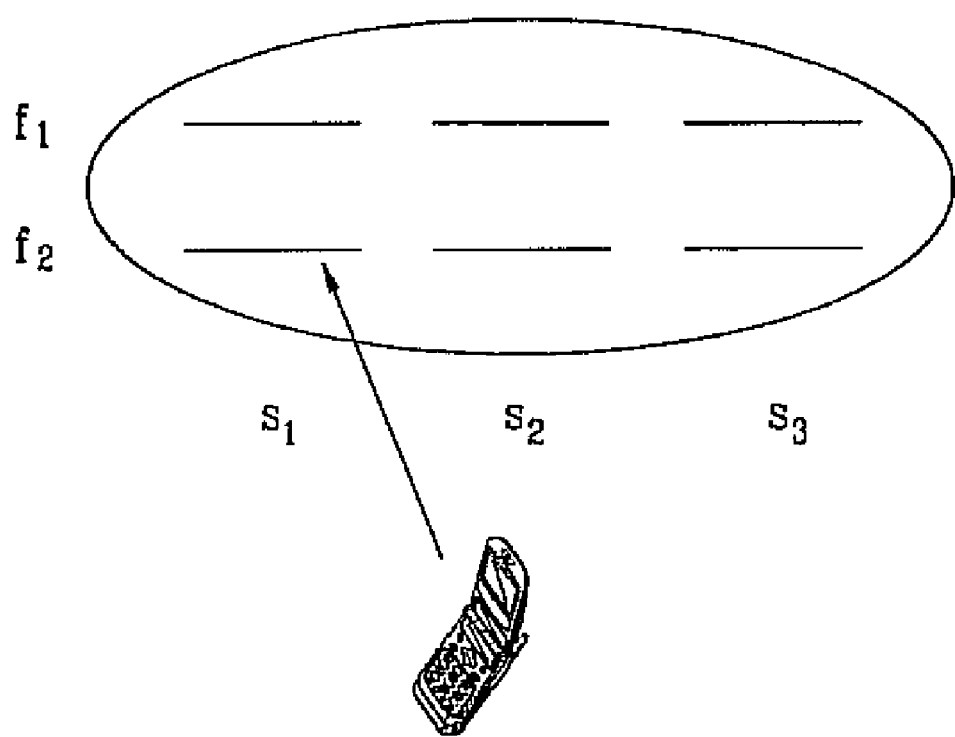
FIG. 18 is an exemplary diagram illustrating selection of a pilot by the receiving end for multiple sectors.

FIG. 18 is an exemplary diagram illustrating selection of a pilot by the receiving end for multiple sectors. More specifically, referring to FIG. 18, the receiving end selects a pilot in sector 1 (S1) on frequency 2 (f2) out of six (6) pilots as its FL server with a single feedback channel. Here, the receiving end is assumed to be capable of monitoring pilots on different carriers simultaneously. The CQI cover can be used to select the sector or distinguish different sectors. Moreover, the CQI cover is the same for all sectors.

Figure 19:
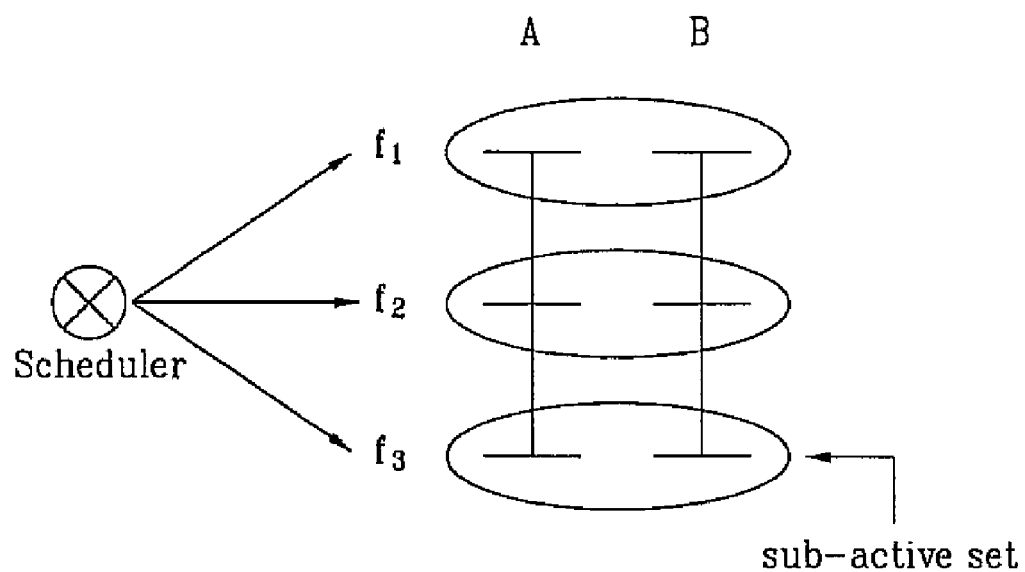
FIG. 19 is another exemplary diagram illustrating selection of a pilot by the receiving end for multiple sectors.

An alternative description of FIG. 18 is FIG. 19. FIG. 19 is another exemplary diagram illustrating selection of a pilot by the receiving end for multiple sectors. In FIG. 19, there are three (3) sub-carries labeled f1, f2, and f3. Moreover, there are two antennas or sectors, A and B. As shown in the figure, the sub-carrier is selected where the selected sub-carrier applies to both antennas/sectors A and B. There are three (3) feedback channels here per sub-carrier (e.g., f1, f2, and f3). Figuratively, the sub-carrier is selected horizontally. Here, the selection made can be referred to as a sub-active set, the details of which are described above. In other words, the receiving end can use the feedback information (e.g., CQI) to make the selection.

Figure 20:
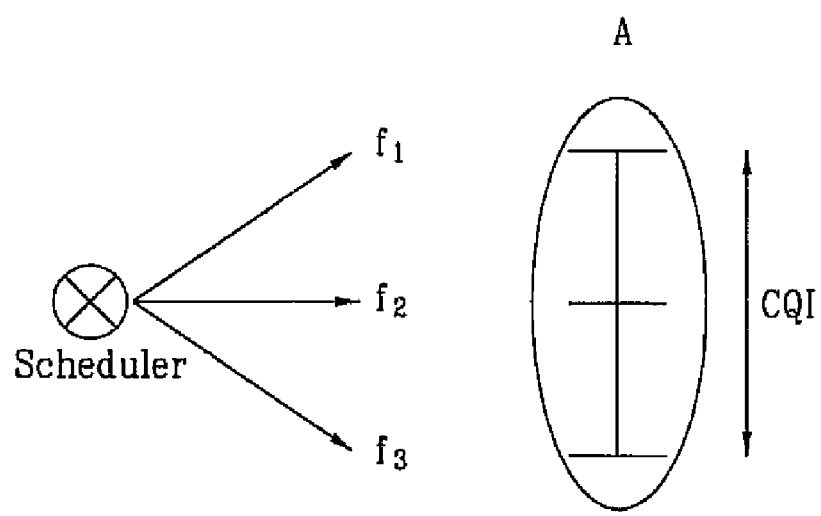
FIG. 20 is an exemplary diagram illustrating selection of a pilot by the receiving end for a single sector.

FIG. 20 is an exemplary diagram illustrating selection of a pilot by the receiving end for a single sector. Referring to FIG. 20, the CQI cover is used to distinguish different carriers, and the CQI cover is different for each sector/antenna. Figuratively, the sub-carrier can be selected vertically. Here, there is one feedback channel whereas in FIG. 19, there are three feedback channels. Similarly, the feedback information (e.g., CQI) can be used by the receiving end to make the selection.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting data packets in a wireless communication system using a multiple input multiple output (MIMO) scheme supporting multiple carriers, the method comprising:
    receiving feedback information from at least one access terminal, wherein the feedback information comprises information of at least one combination of a carrier or a subcarrier, an antenna and a sector, and information indicating a best pilot type corresponding to each antenna of the at least one combination from among predefined pilot types,
wherein the at least one combination has the best channel condition; and
    transmitting a transmit packet via at least one data channel based on the best pilot type corresponding to each antenna of the at least one combination having the best channel condition; wherein re-transmission of subsequent transmit packets are performed using an automatic request (ARQ) or an hybrid-ARQ (HARQ) scheme using the at least one combination which can be set to be different from the previous at least one combination used to transmit the previous transmit packet based on the received feedback information.

2. The method of claim 1, wherein the transmit packet is transmitted via the at least one combination having the best channel condition.

3. The method of claim 2, wherein the transmit packet is transmitted via the best pilot type corresponding to the antenna of the at least one combination having the best channel condition.

4. The method of claim 1, wherein the feedback information further comprises a number of carriers available for transmission.

5. The method of claim 1, wherein the transmit packet is transmitted using a transmission format different from a transmission format of a previously transmitted at least one transmit packet.

6. The method of claim 5, wherein the transmission format refers to a modulated format.

* * * * *